United States Patent [19]
Confino et al.

[11] 3,785,561
[45] Jan. 15, 1974

[54] DEVICE FOR THE EMISSION OF VOLATILE PRODUCTS

[76] Inventors: Maurice Confino, Chemin des Greffieres 69, Saint Cyr au Mont d'Or; Gerard Godard, Route de Condrieu 38, Venissieux, both of France

[22] Filed: Jan. 27, 1972

[21] Appl. No.: 221,289

Related U.S. Application Data

[63] Continuation-in-part of Ser. No. 883,312, Dec. 8, 1969, abandoned.

[52] U.S. Cl. ............................................. 239/60
[51] Int. Cl. ........................................ A24f 25/00
[58] Field of Search ................ 239/6, 60, 34, 54

[56] References Cited
UNITED STATES PATENTS

| | | | |
|---|---|---|---|
| 2,783,085 | 2/1957 | D'Angio | 239/60 |
| 3,685,734 | 8/1972 | Paciorek et al. | 239/54 |
| 2,988,284 | 6/1961 | Smith | 239/60 |
| 3,620,453 | 11/1971 | Grancberg et al. | 239/60 |

*Primary Examiner*—Lloyd L. King
*Attorney*—Robert E. Burns et al.

[57] ABSTRACT

A device for diffusing an active substance such as a odorant or insecticide into the atmosphere at a substantially uniform rate. The device comprises a block impregnated with the substance. The block consists of a plurality of slabs, for example, of a gelatine or cellulose derivative, suitably held together.

14 Claims, 2 Drawing Figures

DEVICE FOR THE EMISSION OF VOLATILE PRODUCTS

This is a Continuation-in-part application of prior application Ser. No. 883,312, filed Dec. 8, 1969 and now abandoned.

BACKGROUND OF THE INVENTION

The present invention relates to a device for the continuous emission of volatile products and is particularly concerned with such a device for use against unpleasant odors and/or against insects.

Such devices and classic aerosols have been used for a long time for the prevention of bad smells and harmful insects. These devices are particularly used in habitable premises, warehouses, and stables and, in general, any location sufficiently enclosed so that the vapors of the product can achieve a sufficient concentration to be effective in the ambient air.

The basic principle of these devices consists of the impregnation of an active product in a convenient material chosen to ensure release of the active product as evenly as possible.

Among the materials thus used are materials with large pores or agglomerated fibers as, for example, gelatines, loose cellulose, felts, baked porcelains, agglomerations of activated aluminium or silicons, certain species of wood, numerous natural or synthetic rubbers, particularly with a base of Hevea brasiliensis, polypropene, polybutene or SBR rubber, cellulose derivatives such as:

- cellulose acetates
- cellulose butyrates
- cellulose nitrates
- cellulose acetobutyrates
- cellulose ethers and numerous synthetic resins such as polyvinyls (halogenic, acetic, acetate, butyrate, polydivinylbenzine, polydivinyltoluene, polyvinylene chloride) and their copolymers, polyacrylics (acrylate or metalcylate of polymethyl or polyethyl) polyurethanes, polyolefines, aminoplasts, (urea-formaldehyde or melamine-formaldehyde resins), ethoxylene or epoxy resins (particularly the polyglycidic of polyphenol copolymers), the copolymers as vinyl chloride and acrylo nitrile copolymer or the acetates of vinyl and pyrrolidine, the fluor elastomers, the rubber of silicone, polyesters, polycarbonates, polyamides, etc.

After impregnation with the chosen active substance, these devices (generally produced in the form of small blocks, the thickness of which are generally of the order of one centimeter), are capable of releasing the active substance they contain, during a period of which can amount to several weeks or even several months.

Despite the advantages of these blocks and the notable progress they have led to in the solution of the previously mentioned problem, they nevertheless have drawbacks owing to the irregularity of the diffusion of the active matter from the device.

One drawback is revealed in the first days by an over rapid release which leads to excessive losses of the active substance, and a concentration in the ambient air much greater than the concentration corresponding to the desired threshold of activity.

In the case of insecticides, this phenomenen can sometimes become dangerous because of the toxicity of the products used. In the case of domestics odorizers, this phenomenen brings about an over-odorization of the room which can be disagreeable to the occupants.

On the contrary, during the last weeks and especially during the last days of use, the quantity of the active substance released becomes insufficient and the block no longer correctly fulfils its role.

According to the invention, these drawbacks are overcome by providing a device for diffusing an active substance into the atmosphere, comprising a block impregnated with said substance, said block comprising a plurality of slabs, and means for jointatively maintaining said slabs in place.

BRIEF DESCRIPTION OF THE DRAWING

Other features and advantages of the present invention will be better understood from the following description of examples of the invention, appended claims and drawings in which:

DESCRIPTION OF THE PREFERRED EMBODIMENTS

Figure 1:
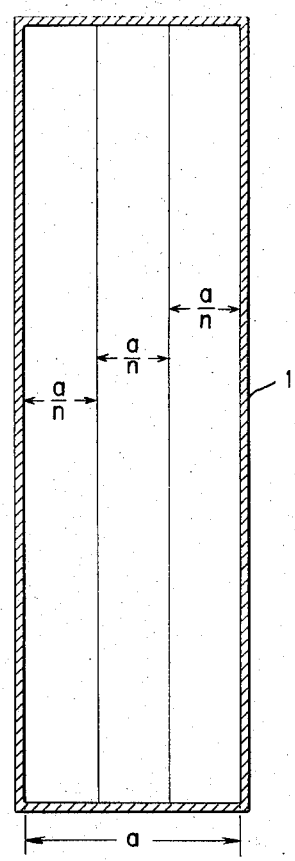
FIG. 1 is a diagramatic vertical view partially in section of a device according to one embodiment of the invention.

Referring to the drawings, FIG. 1 shows a vapor diffusing device in the form of a block made up of a plurality of slabs. The block has a thickness $a$ and each slab has a thickness $a/n$.

This discovery is extremely surprising. As a matter of fact, if one diffusing block of a thickness $a$ and of cross-sectional area S is replaced by $n$ diffusing slabs each of thickness $a/n$ and of the same cross-sectional area S, the exterior diffusing surface area is unchanged but, by the fact that the imperviousness between the individual elemental slabs is never perfect, it could be thought that the evaporation rate would be very much higher.

This, however, is not the case, as is shown in the following example of a device of the type shown in FIG. 1.

Example

Four diffusing blocks of alpha cellulose were prepared, each having the same dimensions (900 × 600 mm), the same thickness (105 mm), and being impregnated with the same quantity (40g) of the following composition:

| | |
|---|---|
| Terpine derivatives | 71.2g |
| Perfume 1069* | 28.6g |
| Organosol green coloring | 0.2g |
| | 100.0g |

(*a product of Societe Gattefosse)

The blocks are different in the following respects:
The first is made up of only one slab (105 mm thick).
The second is made of two slabs joined together, each 52.7 mm thick.
The third is made up of three slabs joined together, each 35 mm thick.
The fourth is made up of four slabs joined together, each 26.2 mm thick.

To verify the evaporation of the impregnated product, the blocks were each suspended in a similar conditioned room and they were weighed at regular intervals to measure the fraction of the active product evaporated.

The results are recorded in the following table:
The figures shown in this table give the percentage of evaporation of the active compound after $n$ days.

| Number of days | Type of block Single slab | 2 joined slabs | 3 joined slabs | 4 joined slabs | 5 joined slabs |
| --- | --- | --- | --- | --- | --- |
| 1 | 18 | 10 | 9 | 8 | 7 |
| 2 | 30 | 16 | 15 | 14 | 13 |
| 3 | 36 | 20 | 19 | 17 | 16 |
| 4 | 40 | 24 | 22 | 20 | 19 |
| 5 | 44 | 27 | 25 | 22 | 21 |
| 10 | 60 | 40 | 38 | 36 | 35 |
| 20 | 78 | 54 | 50 | 46 | 45 |
| 30 | 92 | 62 | 58 | 55 | 54 |
| 40 | 99 | 70 | 66 | 64 | 63 |
| 50 | — | 78 | 74 | 72 | 71 |
| 60 | — | 85 | 81 | 79 | 78 |
| 70 | — | 91 | 87 | 85 | 84 |
| 80 | — | 96 | 92 | 90 | 89 |
| 90 | — | 99 | 95 | 92 | 90 |
| 100 | — | — | 97 | 94 | 93 |
| 110 | — | — | — | 96 | 95 |

The results shown in the table clearly demonstrate the advantages of the device according to the invention since it allows the diffusion of the same quantity of active substance during a considerably larger period (the gain of active time being up to 200 percent).

Apart from the saving of active substance and the advantage of availability to the user of a diffuser of a longer life, the principal advantage of this device is the regularity of the diffusion obtained, which allows a good deal of the aforementioned drawbacks to be obviated.

Figure 2:
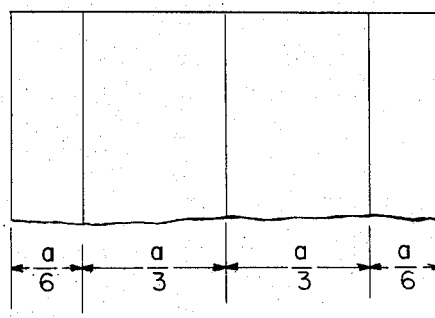
FIG. 2 is a partial diagramatic vertical section of a device according to an alternate embodiment of the invention.

FIG. 2 illustrates an alternate embodiment in which a vapor diffusing block is made up of four stacked slabs which are not all of equal thickness.

Example

In the following table, various diffusing blocks were tested with the results indicated. Three series of tests were conducted each using slabs 900 × 600 mm impregnated with the following insecticidal composition:
 95 percent of D.D.V.P.
 5 percent of epichlorhydrin.

Column I in the following table shows the rate of evaporation of a vapor diffusing block made up of four stacked blocks joined to one another, each slab being 3 mm thick.

Column II shows the rate of evaporation of a vapor diffusing block having a width $a$ made up of four slabs stacked together as shown in FIG. 2. The two inner slabs were each 4 mm thick (i.e., $a/3$) and the two outer slabs were each 2 mm thick (i.e., $a/6$). All four slabs were impregnated with the composition indicated above.

Column III shows the rate of evaporation of a diffusion block made up of four slabs having the same dimensions as the four slabs used in the prior test (Column II), however, only the two central slabs, i.e., the 4 mm thick slabs, were impregnated with the insecticidal composition. Thus, in this test, the device comprised slabs of unequal concentration of the active substance.

The results are indicated in the following table in which the figures set forth the percentage of evaporation of the active compound after $n$ days.

| No. of days | Type of Block 4 slabs of equal widths | 4 slabs of unequal width (all impregnated) | 4 slabs of unequal width (not all impregnated) |
| --- | --- | --- | --- |
| 1 | 3 | 2 | 3 |
| 2 | 6.5 | 5.5 | 6 |
| 3 | 10 | 8.5 | 9 |
| 4 | 12.5 | 11.5 | 12 |
| 5 | 15 | 14 | 14.5 |
| 10 | 31.5 | 29.5 | 30.5 |
| 20 | 54 | 51 | 52 |
| 30 | 64 | 59.5 | 62.5 |
| 40 | 69 | 64 | 67 |
| 50 | 72 | 69 | 71 |

The results in the above table show that for the blocks tested, all of which had the same overall thickness, the rate of evaporation of a block having slabs of unequal thickness was very close to that of a block having slabs of equal thickness. Thus, it is not required that all of the slabs be of equal thickness.

The results in the above table also show that where only some of the slabs were impregnated, the results are very close to those obtained where all of the slabs are impregnated with the same concentration. What occurs is that initially the active substance diffuses very quickly from the impregnated slabs to the non-impregnated slabs until a balance is obtained, whereupon all of the slabs thereafter diffuse the active substance.

As for impregnation of the device according the invention, this can be carried out according to the conventional methods used for onepiece diffusers, namely:
 dipping the block into a composition
 molding the composition, possibly with the intermediary of a dosing device, etc. .

When the constituent blocks have a plastic material base, the impregnation can be made by dry or hot mixing of the evaporating compound with a powder or a liquid solution of the plastic material used.

Such a process is described in the French Pat. Nos. 1,326,385 and 1,404,681 of the Shell company.

Among the products capable of being incorporated in these blocks according to the invention, can be mentioned:
 insecticides (and particularly phosphoric esters such as dimethyl phosphate and 2-2 dichlorovinyl or DDVP). Thus, for example, the following composition could be incorporated in one of the previously mentioned substances.
 D.D.V.P. 60
 dibutylphthalate 29
 paraffin oil 10
 perfume 1
 the insectifuges such as aromaotic hydrocarbons, possibly chlorinated, (Naphthalene, paradichlorobenzines), dimethyl phthalate, certain insectifuge essences such as citronella etc., and forming the following composition for example:
 dimethyl 98
 Lavender essence 2
 odoriferous or deodorising products of natural or synthetic origin such as: turpentine essence derivatives, pine oil, lavender, lilac, jasmin, rose essences, etc.
 bactericides such as: phenols, alcoylsphenols, halogenous or not (particularly hexylresorcinol, resorcinol, chloroxylenols, glycols, etc.) and forming, notably, the following composition:

| | |
|---|---|
| Terpinol | 80 |
| Thymol | 10 |
| Hexylresorcinol | 10 |

Also, mixtures of several of the products mentioned beforehand can be used as active agents for the compositions to be diffused.

The active substances capable of being used with this device according to the invention must have a sufficient volatility and a vapor tension to be diffused into the atmosphere.

When the characteristics are not correctly completed by the active substance itself, it is possible to prepare a formulation containing the active matter, dissolved, for example, in a conveniently chosen solvent (for example, aliphatic hydrocarbons, alcohols, ketones, phenyls and polyphenyl chlorides, phthalates) in such a way that the formaulation thus obtained has suitable physical properties.

In addition to the active matter and the solvent the usable formulations could contain different additives such as, particularly, tensioactive products, anionic, cationic, cationic or non-ionic thickeners, or plastifiers (phosphates, adipates, phthalates).

According to a secondary characteristic of the present invention, one can also add a colorant soluble in the impregnated composition to be diffused but insoluble in the substance constituting the block. Gradually during evaporation until it almost completely disappears, the intensity of the coloring diminishes, and the coloring being dispersed in the substrate without noticeably coloring it. The user thus has available a means of verifying the condition of the block.

In order to obviate any premature diffusion of the active compound before its application by the user (particularly during stocking and shipping), the blocks according to the invention should be wrapped in a sachet, made in a vapor-proof material for example, thin metal foil, plastic material, water-proofed paper or a combination of several of these materials.

For their practical use, the blocks according to the invention must be provided with a convenient device to hold the constituent slabs together.

Numerous such devices are possible, the choice between one or the other being fundamentally determined by the use to which the block is to be put, and the desired cost price.

Naturally, for an insecticide block intended to be located in premises inhabited by animals, the outside appearance of the block is of little importance and the method of assembly chosen could be, therefore, much cheaper; for example, a very simple system of braces made from sting or rubber bands arranged in a cross.

If it is necessary to produce a more finished appearance, the block could be inserted into a simple metal strip 1 such as aluminium for example, having the length of the block, the edges of which cover the periphery and are bent over by a few millimeters at the side of the block.

In the case when the block contains relatively dangerous insecticide products, and when it is thus desired to avoid contact with the block one of the previously described devices can be used and the block then placed in a covering such as that described in French Pat. No. 1,526,990, filed on Jan. 24, 1967, by the applicant. A covering case can be made, for example, in two parts swivelling about a pivot, and of which the closure (by riveting, for example) ensures that the blocks are held one against the other thereby ensuring the safety of the block thus packaged.

The case can be made with any suitable material whatsoever and can be perfected, if desired; for example, it can be provided with a moveable shutter so that the area of the evaporation can be adjusted at will, and if required to completely cover the diffusing surface thus halting the diffusion during a period of time.

The homogeneous state of the block can be equally ensured by placing the constituent slabs in a sachet, for example, in plastics and the inside dimensions of which are equal to the dimensions of the block, proofed against the vapors of the active composition.

What is claimed is:

1. A vapor diffusing device comprising, means for treating air at a substantially uniform rate of treatment comprising a plurality of air-treating slabs having a constant size throughout use of the device and disposed in stacked relationship for treating the air with a volatile substance diffused at a substantially uniform rate, each of said slabs having a major surface and said slabs being disposed with major surfaces opposed and in direct contact, means holding said slabs assembled in a stack and exposed to the atmosphere in use, at least some of said slabs comprising an impregnated non-volatile porous material and a volatile impregnant for treating the air.

2. A vapor diffusing device according to claim 1 wherein some of said slabs are thicker than others.

3. A vapor diffusing device according to claim 1 wherein said slabs are of equal thickness.

4. A vapor diffusing device according to claim 1 wherein less than all of said slabs are initially impregnated with said non-volutile porous material and said volatile impregnant.

5. A vapor diffusing device according to claim 1 wherein all of said slabs are impregnated with said non-volatile porous material and said volatile material.

6. A vapor diffusing device according to claim 1, in which said impregnated material comprises a material having large pores.

7. A vapor diffusing device according to claim 6, in which said impregnated material comprises agglomerated fibers.

8. A vapor diffusing device according to claim 6, in which said impregnated material comprises a cellulose derivative.

9. A vapor diffusing device according to claim 6, in which said impregnated material comprises a synthetic resin.

10. A vapor diffusing device according to claim 6, in which said impregnant comprises a deodorant. 1

11. A vapor diffusing device according to claim 6, in which said impregnant comprises an ordorant.

12. A vapor diffusing device according to claim 6, in which said impregnant comprises an insecticide.

13. A vapor diffusing device according to claim 6, in which said impregnant comprises an insectifuge.

14. A vapor diffusing device comprising, means for treating air at a substantially uniform rate of treatment comprising a plurality or air-treating slabs having a constant size throughout use of the device and disposed in stacked relationship for treating the air with a volatile substance diffused at a substantially uniform rate, each of said slabs having a major surface and said slabs being disposed with major surfaces opposed and in direct contact, means holding said slabs assembled in a stack and exposed to the atmosphere in use, said stack having a thickness $a$ between the outermost major faces of the stacked slabs, each slab having a thickness $a/n$ in which $n$ is the total number of slabs in said stack, each slab comprising an impregnated non-volatile porous material and a volatile impregnant in said slabs for treating the air.

* * * * *